United States Patent
Stump

(10) Patent No.: US 12,153,859 B2
(45) Date of Patent: Nov. 26, 2024

(54) METHOD, SYSTEM, AND NETWORK FOR CREATING 3D OBJECTS

(71) Applicant: Fathom, Inc., Oakland, CA (US)

(72) Inventor: Richard Stump, Danville, CA (US)

(73) Assignee: Fathom, Inc., Oakland, CA (US)

( * ) Notice: Subject to any disclaimer, the term of this patent is extended or adjusted under 35 U.S.C. 154(b) by 0 days.

(21) Appl. No.: 17/359,970

(22) Filed: Jun. 28, 2021

(65) Prior Publication Data

US 2021/0326493 A1 Oct. 21, 2021

Related U.S. Application Data

(63) Continuation of application No. 14/217,155, filed on Mar. 17, 2014, now Pat. No. 11,048,829.

(60) Provisional application No. 61/875,978, filed on Sep. 10, 2013, provisional application No. 61/801,373, filed on Mar. 15, 2013.

(51) Int. Cl.
*G06F 30/00* (2020.01)
*B29C 33/38* (2006.01)
*G06F 113/22* (2020.01)

(52) U.S. Cl.
CPC .......... *G06F 30/00* (2020.01); *B29C 33/3842* (2013.01); *G06F 2113/22* (2020.01)

(58) Field of Classification Search
CPC ....... B33Y 30/00; B33Y 50/00; B29C 64/386; B29C 64/00; B29C 64/393; B29C 33/3842; G05B 13/04; G05B 17/02; G05B 19/4097; G05B 2219/49008; G05B 19/4099; G05B 15/02; G05B 2219/49019; G05B 2219/35081; G06F 3/12; G06F 3/1203; G06F 3/1229; G06F 3/1259; G06F 3/126; G06F 30/00; G06F 2111/04; G06F 2111/20; G06F 2119/18; G06F 30/20; G06F 2113/22; G06F 30/23; G06F 30/17; G06F 2119/02
See application file for complete search history.

(56) References Cited

U.S. PATENT DOCUMENTS

| | | | | |
|---|---|---|---|---|
| 5,572,430 A | * | 11/1996 | Akasaka | G06F 30/00 700/95 |
| 5,815,683 A | * | 9/1998 | Vogler | G06F 21/6218 709/225 |
| 5,999,908 A | * | 12/1999 | Abelow | G06Q 30/0203 434/118 |
| 6,775,647 B1 | * | 8/2004 | Evans | G06Q 30/06 703/2 |

(Continued)

OTHER PUBLICATIONS

Oktem et al., Application of Taguchi optimization technique in determining plastic injection molding process parameters for a thin-shell part (Year: 2007).*

(Continued)

*Primary Examiner* — Darrin D Dunn
(74) *Attorney, Agent, or Firm* — Kramer Levin Naftalis & Frankel LLP

(57) ABSTRACT

Injection molds can be fabricated using 3D printing technology. An inverse computer aided design ("CAD") file may be generated based upon a visualization file that represents a 3D object. The inverse CAD file can then be altered based upon various parameters associated with the 3D object. One or more injection molds can be fabricated using a 3D printer based on the altered inverse CAD file.

14 Claims, 4 Drawing Sheets

(56) References Cited

U.S. PATENT DOCUMENTS

| | | | | |
|---|---|---|---|---|
| 6,871,182 B1* | 3/2005 | Winnard | .......... | G06Q 10/06395 705/7.41 |
| 7,047,180 B1* | 5/2006 | Mathews | .............. | G06F 16/972 358/1.15 |
| 7,065,420 B1* | 6/2006 | Philpott | .................. | G06Q 30/02 703/1 |
| 7,103,434 B2* | 9/2006 | Chernyak | ............... | G06F 30/00 700/98 |
| 7,233,885 B1* | 6/2007 | Larabee | .................. | G06F 30/00 700/98 |
| 7,603,191 B2* | 10/2009 | Gross | ...................... | G06F 30/00 705/400 |
| 8,514,222 B2* | 8/2013 | Seroussi | ................. | G06F 30/13 345/619 |
| 8,954,297 B2* | 2/2015 | Teller | ..................... | G06N 20/00 703/1 |
| 10,114,591 B2* | 10/2018 | Pettis | .................... | G06F 3/126 |
| 10,394,195 B2* | 8/2019 | Das | .................... | G05B 19/4097 |
| 2001/0047251 A1* | 11/2001 | Kemp | ..................... | G06F 30/13 703/1 |
| 2003/0103089 A1* | 6/2003 | Ramani | .................. | G06T 19/00 715/848 |
| 2003/0173717 A1* | 9/2003 | Abrams | ............. | G08B 13/2445 264/496 |
| 2005/0177453 A1* | 8/2005 | Anton | .................. | G06Q 10/087 705/26.81 |
| 2006/0066609 A1* | 3/2006 | Iodice | ..................... | G06T 19/20 345/419 |
| 2006/0184432 A1* | 8/2006 | Hanechak | .......... | G06Q 30/0641 705/26.5 |
| 2011/0213480 A1* | 9/2011 | Zila | ......................... | G06F 30/13 700/98 |
| 2012/0232857 A1* | 9/2012 | Fisker | .................. | H04R 25/658 703/1 |
| 2013/0124151 A1* | 5/2013 | Mech | .................... | B29C 64/386 703/1 |
| 2014/0039659 A1* | 2/2014 | Boyer | .................... | B33Y 40/00 700/98 |
| 2014/0121820 A1* | 5/2014 | Das | ........................ | G05B 13/04 700/182 |
| 2014/0129020 A1* | 5/2014 | Kroner | ................... | B33Y 30/00 700/118 |
| 2014/0200858 A1* | 7/2014 | Chatow | ................. | G06F 3/1256 703/1 |
| 2015/0234946 A1* | 8/2015 | Teller | ...................... | G06F 30/13 703/1 |
| 2018/0311890 A1* | 11/2018 | Pettis | ..................... | F16M 11/12 |
| 2020/0090241 A1* | 3/2020 | Stump | .................... | B33Y 50/00 |
| 2022/0165744 A1* | 5/2022 | Kim | .................. | H01L 27/11573 |

OTHER PUBLICATIONS

Y.M. Deng, A CAD-CAE Integrated Injection Molding Design System, (Year: 2002).*

Chen et al. (Cost-Effective Design for Injection Molding, 1999 (Year: 1999).*

* cited by examiner

METHOD, SYSTEM, AND NETWORK FOR CREATING 3D OBJECTS

CROSS-REFERENCE TO RELATED PROVISIONAL APPLICATION

This application is a continuation of U.S. patent application Ser. No. 14/217,155, filed Mar. 17, 2014, which claims the benefit of U.S. Provisional Patent Application No. 61/875,978, entitled "SYSTEMS AND METHODS FOR CREATING 3D PRINTED MOLDS," filed on Sep. 10, 2013, and U.S. Provisional Patent Application No. 61/801,373, entitled "SYSTEMS AND METHODS FOR CREATING AND PRICING 3D PRINTED OBJECTS," filed on Mar. 15, 2013, both of which are incorporated herein by reference in their entirety.

BACKGROUND OF THE DISCLOSURE

Three-dimensional ("3D") printing is a rapidly evolving technology field providing individuals with the ability to produce 3D objects quickly and cheaply relative to other methods. However, as 3D printing designs increase in complexity, the time and associated costs with producing 3D printed objects also increase. It would therefore be beneficial to provide systems and methods for printing 3D molding structures to rapidly create 3D objects while accurately anticipating costs.

SUMMARY OF THE DISCLOSURE

Systems and methods for creating injection molds are disclosed. Such systems can include at least one computer to receive, create, and/or modify a Computer Aided Design ("CAD") model of an object. The computer can then generate an inverse of the CAD model to create one or more CAD models that define molds suitable for molding the object. Once the inverse CAD files are generated, various process parameters can be defined on the computer to adapt the inverse CAD files for 3D printing of the molds. If the adapted inverse CAD files are satisfactory, the respective molds can be physically created by processes suitable for the defined process parameters, such as 3D printing or machining, for example. The object can then be physically created using one or more injection molding processes utilizing the physical molds.

Two conspicuous advantages of 3D printing molds over casting steel/aluminum molds are substantial reductions in both lead-time and cost. It generally takes several weeks to months to build steel/aluminum tooling molds. A typical 3D-printed mold, however, may be printed in a matter of hours. Furthermore, mistakes, weaknesses, and other problems in the mold design may only become apparent after machining, potential requiring many time-consuming design iterations before a suitable mold is produced. Multiple design edits may go from the designer to the tool engineer until the final mold design and quality are achieved, resulting in higher costs and product time to market.

Despite the advantages associated with using 3D printing techniques to rapidly develop and construct a single object, it is typically more efficient to mold large numbers of objects than it is to print the objects directly. That is, while 3D printing may allow a single object to be generated quickly and cheaply, once a mold is created it may be more efficient to cast objects in the mold than it is to print them. The embodiments disclosed herein take advantage of the strengths of each process, namely using 3D printing techniques to generate molds quickly and cheaply.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE DISCLOSURE

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features.

Figure 1:
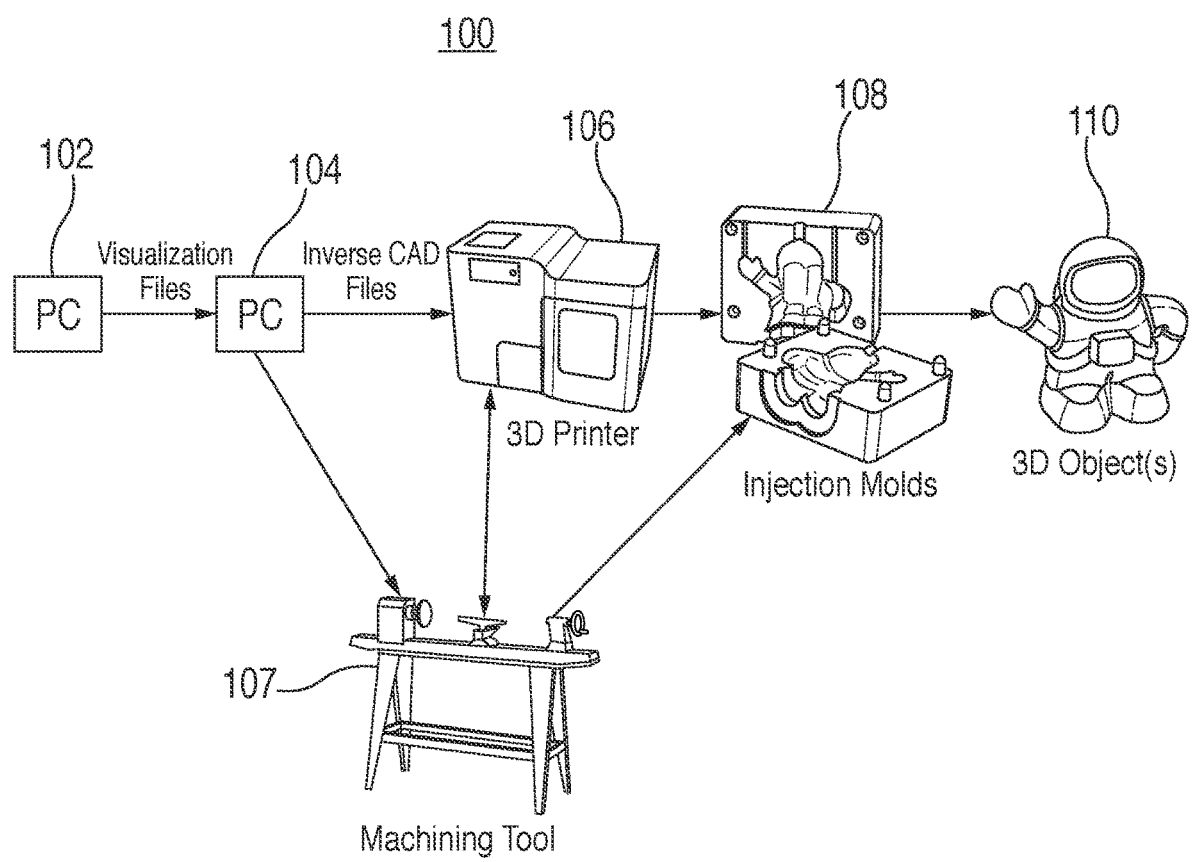
FIG. 1 shows a schematic diagram of an illustrative system for creating injection molds, in accordance with some embodiments.

FIG. 1 shows a schematic diagram of an illustrative system 100 for creating injection molds, in accordance with some embodiments. System 100 can include a client device 102, a Computer Aided Design ("CAD") device 104, a 3D printer 106, a machining tool 107, injection mold(s) 108, and 3D object(s) 110. The various elements of system 100 may be used to quickly and inexpensively create 3D injection molds for injection molding 3D objects.

Client device 102 can be any electronic device or system capable of communicating with CAD device 104 (e.g., over a network). Examples of client devices may include portable media players, cellular telephones, pocket-sized personal computers, personal digital assistants ("PDAs"), desktop computers, laptop computers, and/or tablet computers. Client device 102 can include control circuitry, storage, memory, communications circuitry, input and/or output interfaces as well as additional features not shown. Furthermore, one or more components of client device 102 can be combined or omitted.

In some embodiments, client device 102 can generate, edit, and/or store one or more visualization files representing a model of a 3D object. Such visualization files can provide data for rendering a two-dimensional ("2D") and/or 3D visualizations of the 3D object on a display device communicatively coupled to, or integrated in, client device 102. It should be appreciated that the 3D object may be any type of object imaginable, and that the embodiments disclosed herein should not be understood to apply to only certain types or classes of 3D objects.

Visualization files of various file types generated, edited, or stored on client device 102 may be uploaded to CAD device 104 for further processing in accordance with some embodiments. Examples of visualization file types may include, by way of example, .asm, STL, IGES, STEP, Catia, SolidWorks, ProE, 3D Studio, and/or Rhino files. In some embodiments, the visualization files may include 2D ("flat") digital images, such as a JPEG, GIF, TIFF, BMP, and/or PDF files. A user of client device 102 can transmit (e.g., upload) one or more visualization files to CAD device 104 to begin a process for fabricating injection molds for molding a 3D object.

CAD device 104 may be any suitable electronic device that includes CAD software programmed thereon for receiving, modifying, and/or generating 3D CAD files representing a 3D object. In some embodiments, CAD device 104 may be a computer or other electronic device similar to client device 102 and coupled to client device 102 over one or more wired or wireless network connections.

According to some embodiments, client device 102 may be omitted from system 100. In such embodiments, CAD device 104 may be used to create a 3D CAD model in absence of a visualization file received from a client device. In such embodiments, a CAD file for a 3D object may be completely computer generated on CAD device 104. For example, the CAD file for molding a 3D object may be rendered using CAD software and based on any suitable tangible or imaginary object.

CAD device 104 may be any electronic device suitable to facilitate communications and/or service requests from user devices such as client device 102. Client device 102 can send and/or receive data to and from CAD device 104 over a network. The network can be any network, combination of networks, or network devices that can carry data communications. For example, the network can be any one or any combination of LAN (local area network), WAN (wide area network), telephone network, wireless network, point-to-point network, star network, token ring network, hub network, or any other configuration. Further, the network can support any number of protocols such as, for example, Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDEN, LTE or any other suitable cellular network protocol), infrared, TCP/IP (e.g., any of the protocols used in each of the TCP/IP layers), HTTP, BitTorrent, FTP, RTP, RTSP, SSH, Voice over IP (VOIP), any other communication protocol, or any combination thereof. In some embodiments, the network can provide wired communications paths between client device 102 and CAD device 104.

Upon successful receipt of a visualization file, CAD device 104 can convert the visualization file into a 3D CAD file, if necessary. That is, if the visualization file is not already formatted as a 3D CAD file compatible with the CAD software installed on CAD device 104, CAD device 104 may appropriately convert the visualization file. According to some embodiments, converting a visualization file into the compatible 3D CAD file may involve CAD device 104 (i) determining the number of triangles required to fill the region of an object represented in the visualization file and (ii) generating a 3D file (e.g., 3D CAD file) based on the number of triangles occupied by the volume of the object. An STL file, for example, may describe a raw unstructured triangulated surface by the unit normal and vertices (ordered by the right-hand rule) of the triangles using a 3D Cartesian coordinate system. Triangulation may be defined herein as the subdivision of a geometric object into triangles. In some embodiments, a third-party application may determine the number of triangles for an object. The use of triangles is merely illustrative, however, and any shape may be used to calculate the volume of the object in the visualization file.

Once CAD device 104 has received, generated, converted, and/or modified the visualization file to create a 3D CAD file of a 3D object, CAD device 104 may generate an inverted 3D CAD file based on the 3D CAD file. The inverted 3D CAD file may represent one or more portions of a mold for molding the 3D object. Because a mold may be defined as a body having a hollow volume defining a pattern, the hollow volume can be visualized as the negative of a 3D object that may be cast in the mold. Thus, the inverted 3D CAD file can represent a body having a hollow volume in the shape of the 3D object.

Inverting a 3D CAD file may involve generating a 3D structure (e.g., a box) around the external topography of the 3D object represented in the 3D CAD file. Space between outer surfaces the 3D structure and the external topography of the 3D object can then be designated as a solid structure for the purposes of the inverted 3D CAD file, while space inside the bounds of the external topography of the 3D object may be designated as empty, hollow space.

Once the inverted 3D CAD file is generated, CAD device 104 can receive a selection of parameters related 3D object(s) 110 (e.g., from a user of CAD device 104 and/or client device 102). These parameters may include the dimensions, final material, desired finish, complexity, and/or quantity of 3D object(s) 110 to be molded, for example. Each of these parameters, along with the peculiar geometries represented in the inverse CAD file, may alter various features of injection mold(s) 108 to a greater or lesser extent as described in detail below.

Based upon the selection of parameters related to 3D object(s) 110, CAD device 104 may design various features of injection mold(s) 108. Such features may be designed by modifying the inverse CAD file, defining required and/or suggesting potential injection mold materials, and/or determining whether one or more "fixtures" or "reinforcements" will be required. Further, the selection of parameters may result in modifying the number of injection molds 108 required to cast 3D object(s) 110.

According to some embodiments, once the inverse CAD file is created and the parameters are selected, CAD device 104 can design various features of injection molds 108. The various designed features may include, for example: the location of one or more parting lines (e.g., the place where two or more parts of a mold meet); the gate styles and locations (e.g., the shapes and locations of where the molding material enters the mold cavity); the runner system (e.g., the locations and pathways for relatively small channels through which the molding material flows towards the gates); the sprue system (e.g., the locations and pathways for relatively large channels through with the molding material flows toward the runners); the side core inserts, pickouts, and core pins; the cooling system; any necessary fixtures; the part ejection system; the surface finish; the venting system; and various cores and cavities. Each of these design features may depend on the peculiar geometries, dimensions, complexity, and materials chosen to form 3D object(s) 110.

As mentioned briefly above, in some embodiments, injection mold 108 may require the incorporation of one or more "fixtures." As used herein, a fixture can refer to a foreign object that may incorporated into injection mold 108 (e.g., during 3D printing of the mold). A fixture may be required, for example, to reinforce relatively thin portions of injection mold 108 that may not be able to withstand an adequate number of molding process repetitions. That is, because thin portions of an injection mold may be liable to break, bend, stretch, or otherwise deform when exposed to a molding process, such portions can be reinforced with fixtures. Typical fixtures may include metal rods, panels, or frameworks, for example.

Similarly, injection mold 108 may be 3D printed, machined, or otherwise formed to include one or more fixture retention features. A fixture retention feature may be a physical feature of injection mold 108, such as a clip or indentation, for example, configured to receive a fixture. Before initiating an injection molding process, the fixtures may be placed within injection mold 108. Thus, during the injection molding process, the fixtures may be incorporated within the molded object to provide extra strength and/or support to the object itself.

According to some embodiments, CAD device 104 can identify whether or not one or more fixtures are required within injection mold 108 and/or the object to be molded using injection mold 108. Accordingly, CAD device 104 may analyze the inverse CAD file and determine whether the associated injection mold or object to be molded includes any features with dimensions less than one or more predetermined thresholds. For example, CAD device 104 may determine that one or more features of injection mold 108 has a thickness below or an aspect ratio in excess of a predefined threshold. CAD device 104 can then design and/or suggest suitable fixtures for reinforcing such features. CAD device 104 may also design a system for constraining the fixture(s) such that they are properly incorporated within injection mold 108 during a 3D printing process. For instance, a robotic arm may hold a fixture in place above the printing stage of a 3D printer such that injection mold 108 is printed around the fixture, thereby incorporating the fixture into injection mold 108.

In some embodiments, the material selected for casting 3D object(s) 110 may determine which materials are most suitable for creating injection mold(s) 108. The various selected materials may include, for example, acrylonitrile butadiene styrene ("ABS") like materials, photopolymers, other types of plastics, rubber, silicone, nylons, epoxies, metals, and/or any other suitable material or materials. Depending on the choice or choices of materials for forming 3D object(s) 110, injection molds 108 may be formed from a suitable material such as a 3D printed photopolymer, aluminum, steel, brass, or epoxy.

If it is determined (e.g., based on the material selected for all or a portion of 3D molded object 110) that an injection mold 108 can be formed using 3D printing technology, CAD device 104 can provide the inverse CAD file for injection mold 108 to 3D printer 106. 3D printer 106 can then fabricate injection mold 108 based upon the inverse CAD file. If some portion injection mold 108 cannot be fabricated using 3D printer 106, machining tool 107 may be used to either wholly fabricate injection mold 108 or fabricate those portions of features of injection mold 108 that cannot be printed.

In some embodiments, visualization files received from client device 102 may include metadata indicating a geographical location associated with the file. In such embodiments, CAD files may be generated for creating 3D molds of related landmarks associated with the specific geographical location. For example, a user can take a picture of a friend or family member posing in front of the Golden Gate Bridge. The digital image can contain metadata (e.g., geo-tagging) indicating that this photo was taken in region of San Francisco, CA close to the Golden Gate Bridge. A user of client device 102 can upload the digital image including geographic metadata to CAD device 104. Software provided on CAD device 104 can then recognize that the digital photo includes not only a person, but a particular geographical landmark (e.g., the Golden Gate Bridge). CAD files for printing 3D molds of both the friend and family member pictured in the image and also a properly scaled 3D representation of the Golden Gate Bridge may be generated by CAD device 104. This functionality can provide a wonderful memento of a family trip or excursion to a particular location.

In some embodiments, 3D printer 106 may include a liquid photopolymer cartridge. The liquid photopolymer may be vacuumed into an inkjet printhead that includes a UV light, which may cure the liquid photopolymer. Thus, the photopolymer can solidify as it is applied to a substrate, which may be a build tray and/or hardened photopolymer depending on the progress of the printing process. While the use of liquid photopolymers for 3D printing has been disclosed, one skilled in the art will appreciate that other 3D printer 106 may perform various other 3D printing processes without straying from the scope of this disclosure.

In further embodiments, and depending on the selection of parameters, a mold backbone may be provided to strengthen and/or reinforce injection mold 108 as described below with respect to FIG. 3. As used herein a "mold backbone" may be a structural member than can encase an injection mold (e.g., injection mold 108). Accordingly, the mold backbone may be formed from a relatively strong and resilient material (e.g., machined aluminum or stainless steel, or a resilient plastic or composite). In some embodiments, injection mold 108 may be placed inside of the mold backbone. In other embodiments, the mold backbone may be molded over injection mold 108 (e.g., using an injection molding process). In general, mold backbone may allow injection mold 108 to withstand higher temperatures and/or pressures than the mold would otherwise be able to withstand, which can increase the types of materials that can be cast using injection mold 108.

In some further embodiments, injection mold 108 may be exposed to a plating process (e.g., electroplating) to strengthen, reinforce, or otherwise beneficially alter injection mold 108, such as by extending its life, for example. For instance, injection mold 108 can be plated with a metal (e.g., a refractory metal such as tungsten or tantalum), which may still further increase the types of materials that can be cast using injection mold 108. Plating and other similar post-processing techniques may also be chosen to alter the surface finish of 3D molded object 110. For example, injection mold may be post-processed with a smooth or textured finish in order to impart a smooth or textured finish, respectively, to 3D molded object 110.

For materials that cannot be cast using a 3D printed injection mold despite a mold backbone being provided and/or the 3D printed injection mold being plated, injection mold 108 may be machined using typical state-of-the art machining techniques. In some embodiments, a machined injection mold (e.g., an aluminum injection mold) may be required for only one material of a multi-material product. Thus, for any given set of injection mold(s) 108 for producing a 3D object, any number of the molds may be 3D printed and any number of the molds may be machined.

According to some embodiments, 3D molded object 110 may require two or more "shots," where each shot represents the amount of material required to fill a particular mold. For instance, if 3D molded object 110 includes two or more different materials and/or two or more different colors, each material/color may require a separate injection mold 108 to receive each shot. In such embodiments, the injection mold fabricated for each shot may be individually crafted as described above according to parameters selected for that material. In other embodiments, a single injection mold may be designed to receive more than one shot (e.g., via different gates) such that only one injection mold is necessary even for multi-shot molding processes.

Contrariwise, even if 3D molded object 110 requires only one material type, it may be beneficial to fabricate at least two injection molds for molding 3D molded object 110. For instance, a first mold may be fabricated for molding coarse structural features of 3D molded object 110, and a second mold may be fabricated for molding detailed features over the coarse structural features (e.g., as a second-shot overmold). The coarse structural features formed in the first shot may be, for example, molded using a cheaper material (e.g., an epoxy or other filler) than the material used for subsequent shots that may define the detailed outer features of 3D molded object 110. In some embodiments, a separate injection mold may not be provided to mold such coarse structural features. Rather, preformed filler members, such as epoxy plugs, for example, may be placed within injection mold 108, such that the fine structural features of 3D molded object 110 are molded over the preformed filler members.

Similar filler materials may be used in the fabrication of injection mold 108. For example, 3D printer 106 may print only a shell of injection mold 108. The balance of injection mold 108 may be formed from a filler, such as an epoxy or resin, for example. The 3D printed portion of injection mold 108 may be coupled to the non-printed portion using any suitable method, such as, for example, the non-printed portion being molded over the printed portion, the printed portion being adhered to the non-printed portion using an adhesive and/or thermal bonding, and/or the printed portion being placed in contact with the non-printed portion during a curing process that sets and hardens the non-printed portion. Using a filler material to form at least part of injection mold 108 may beneficially reduce cost by reducing the printed part volume while improving cycle times due to faster printing times and improved cooling times, as discussed below.

In embodiments in which injection mold 108 includes a mold backbone, the filler material may occupy the space between the printed portion and the mold backbone. For example, the printed portion may be placed inside the mold backbone such that a void remains between the printed portion and the mold backbone, and the filler may be injection molded into the void. In other embodiments, the mold backbone may be filled with the filler material prior to incorporating the printed portion. In these embodiments, the filler material may be soft enough (when the printed portion is placed) to substantially conform to the shape of the printed portion such that injection mold 108 can be a solid form without significant air gaps. After the printed portion is placed, the filler material may be hardened (e.g., using a curing process). As noted above, adhesion between the printed portion and the non-printed portion may be enhanced using an adhesive and/or thermal bonding.

Still further, the filler material incorporated into injection mold 108 may be chosen to provide benefits that may not be available in materials suitable for 3D printing, such as enhanced strength, rigidity, flexibility, and/or thermal conductivity, for example. For instance, a filler material with particularly good bulk thermal conductivity may be chosen to enhance cooling during and after the injection molding process. To that end, the filler material may also incorporate one or more materials (e.g., colloids, metal shavings, etc.) dispersed throughout that can improve one or more desired properties of the bulk filler material.

Figure 2:
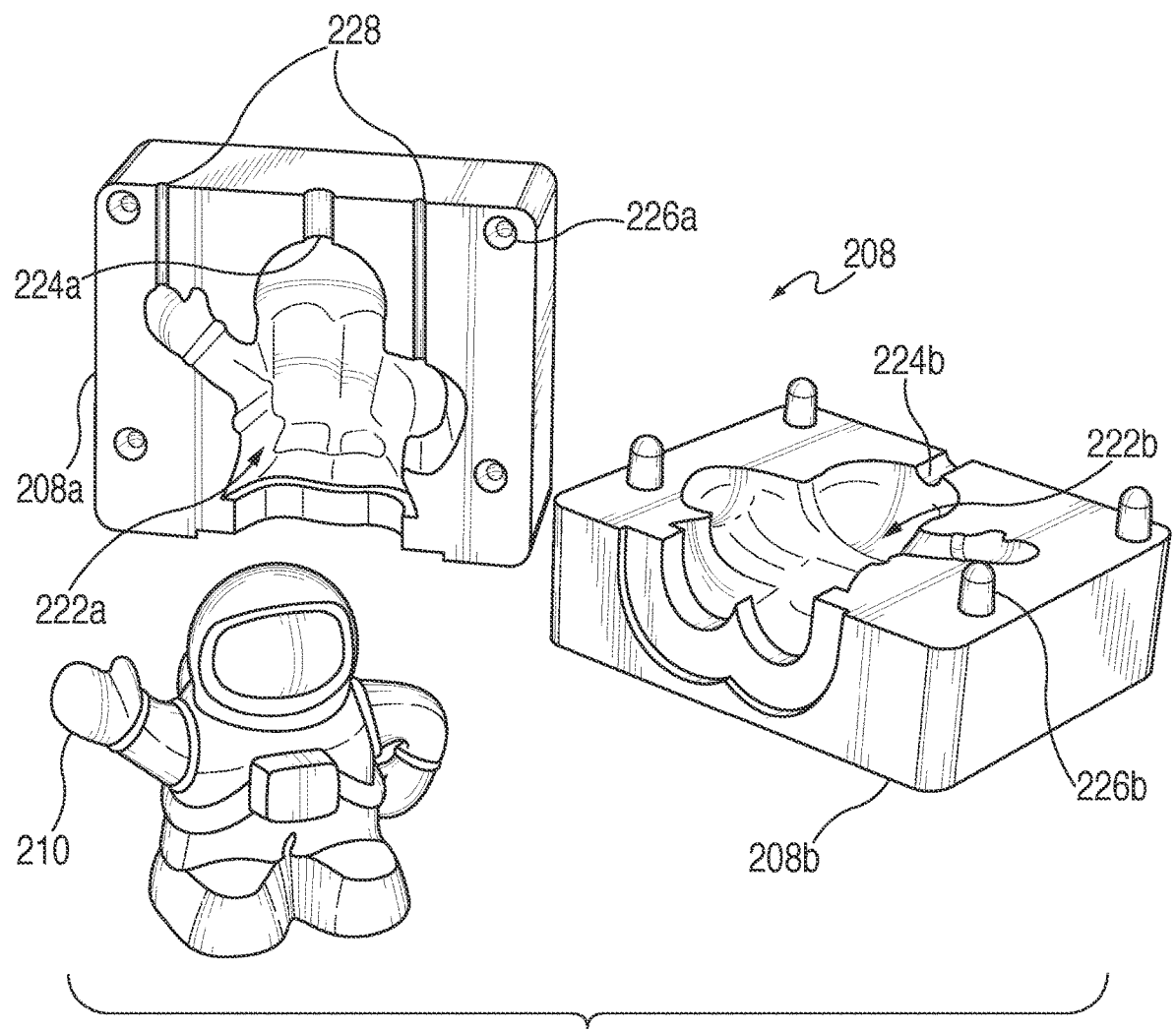
FIG. 2 shows a perspective view of an injection mold and a 3D molded object, in accordance with some embodiments.

FIG. 2 shows a perspective view of injection mold 208 and a 3D molded object 210 in accordance with some embodiments. Injection mold 208 may include a first mold part 208a and a second mold part 208b, mold cavities 222a and 222b, gates 224a and 224b, alignment features 226a and 226b, and air vents 228. A 3D printer (e.g., 3D printer 106 of FIG. 1) can print at least a portion of injection mold 208 based upon an inverted CAD file as described above with respect to FIG. 1, for example. 3D molded object 210 may be an objected cast from injection mold 208.

Mold cavities 222a and 222b can each define a volume corresponding to a portion of the outer surface of 3D molded object 210. That is, material injected into mold cavities 222a and 222b of injection mold 208 can cool and harden into 3D molded object 210. The material injected into injection mold 208 may vary according to the desired properties of 3D molded object 210. Prior to molding 3D molded object 210, first mold part 208a and a second mold part 208b can be brought together, thereby creating a single mold cavity from mold cavities 222a and 222b. Alignment features 226a and 226b can ensure that mold cavities 222a and 222b are properly aligned when first mold part 208a and a second mold part 208b are joined. In some embodiments, the single mold cavity formed from mold cavities 222a and 222b can represent the inverse of a CAD file representing a 3D object.

Material for forming 3D molded object 210 may be introduced into the mold cavity via gates 224a and 224b. As with mold cavities 222a and 222b, when first mold part 208a and a second mold part 208b are brought together, gates 224a and 224b can form a single gate. Gates 224a and 224b may be part of a larger injection molding system including one or more copies of injection mold 208 connected to a single material injection system via one or more a runners and/or sprues (not shown).

Air vents 228 may be formed in injection mold 208 for the expulsion of air from mold cavities 222a and 222b during the injection molding process. Air vents 228 may be formed during the 3D printing process or after the 3D printing process using a material removal process (e.g., machining). Air vents 228 may allow trapped air to escape during the injection molding process, which may help to prevent partial filling of the mold cavity and/or various other defects in 3D molded object 210. In a similar manner, one or more cooling channels may be formed in injection mold 208. These cooling channels can allow a liquid to flow through injection mold 208 to conduct heat away from mold cavity 222 during and after the injection molding process.

Figure 3:
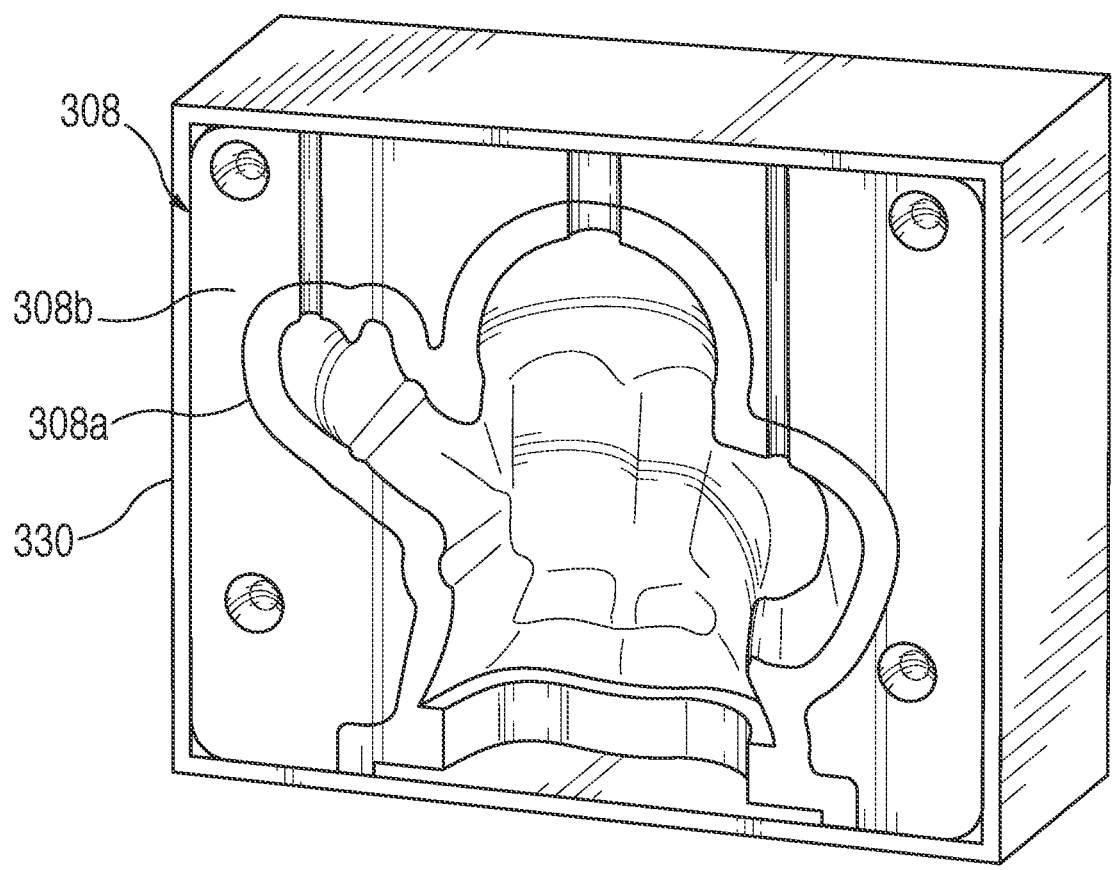
FIG. 3 shows a perspective view of an injection mold and a mold backbone, in accordance with some embodiments.

FIG. 3 shows a perspective view of injection mold 308, including mold portions 308a and 308b, and mold backbone 330, in accordance with some embodiments. Injection mold 308 may be one part (e.g., first mold part 208a of FIG. 2) of multi-part injection mold. Further, as described above, injection mold 308 may include a 3D printed portion 308a and a nonprinted portion 308b. Nonprinted portion 308 may be formed from a filler, such as an epoxy or resin as described above with respect to FIG. 1, for example.

Mold backbone 330 can provide additional structural support for injection mold 308, which may be necessary for casting certain materials that require high temperatures and/or pressures. According to some embodiments, mold backbone 330 may itself be a molded or 3D printed structure. In other embodiments, mold backbone 330 may be machined from a block of material (e.g., aluminum or stainless steel) or may be an injection molded part itself.

In some embodiments, mold backbone 330 may be mass-produced, and the dimensions of mold backbone 330 may be fixed for reasons of cost efficiency. In such embodiments, the outer dimensions of injection mold 308 may not be tailored to conform to mold backbone 330. Therefore, the outer dimensions of injection mold 308 may be larger than would otherwise be required to ensure compatibility with mold backbone 330. A system for creating injection molds (e.g., system 100 of FIG. 1) may calculate, for any given injection mold, whether it is most efficient to add extra printing time and/or material in order to conform to mold backbone 330 or to create a new mold backbone for the injection mold.

Figure 4:
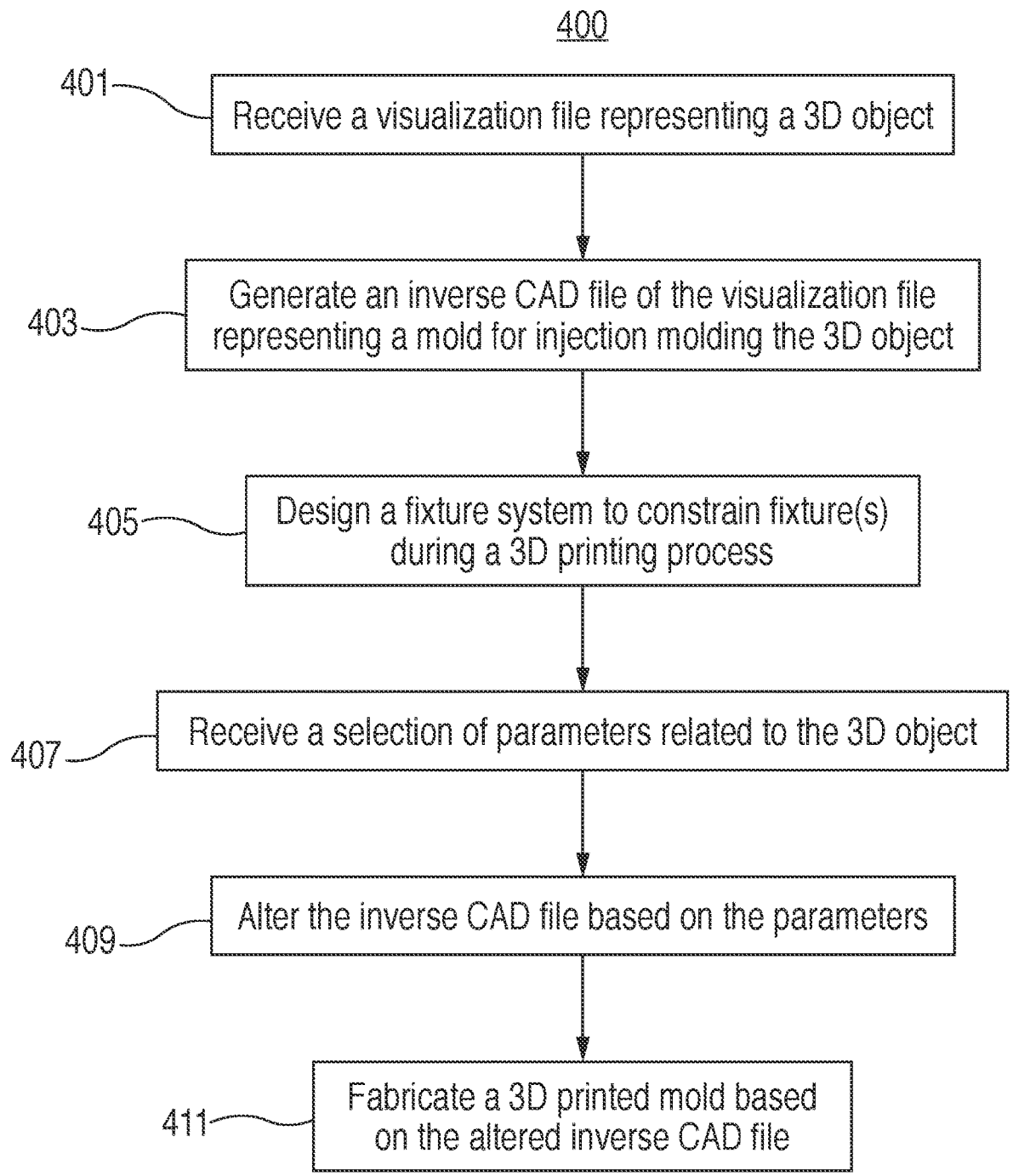
FIG. 4 shows a flowchart of an illustrative process for creating 3D printed injection molds, in accordance with some embodiments.

FIG. 4 shows a flowchart of an illustrative process 400 for creating 3D printed injection molds in accordance with some embodiments. Process 400 can begin at step 401 in which a CAD device (e.g., CAD device 104 of FIG. 1) can receive a visualization file representing a 3D object. According to various embodiments, the visualization file may be generated on the CAD device or received from another device (e.g., client device 102 of FIG. 1) over a network. According to various embodiments, the visualization file may be a CAD file representing a 3D object, including file types such as .asm, STL, IGES, STEP, Catia, SolidWorks, ProE, 3D Studio, and/or Rhino files, for example. The visualization file may also be any suitable digital image, such as a JPEG, GIF, TIFF, BMP, or a PDF file, for example.

After the visualization file is received at the CAD device, the file may be enhanced, altered, fixed, or otherwise edited. For instance, the CAD software running on the CAD device may analyze the visualization file and suggest one or more structural or cosmetic changes to 3D object represented in the visualization file. For example, the CAD software may patch holes and/or fix other defects in the visualization file that represents the 3D object. In another example, the visualization file may be edited to add various geometrical features, such as a serial number, a patent number, a brand name, a bar code, a recycling logo, and/or any other suitable identifying, aesthetic, and/or informational marks.

At step 403, the CAD device can generate an inverse CAD file of the visualization file that represents a mold for injection molding the 3D object. Generating an inverse CAD file may include generating a 3D structure (e.g., a box) around the external topography of the 3D object represented in the visualization file. Space between outer surfaces of the 3D structure and the external topography of the 3D object (e.g., as represented by injection mold 208 of FIG. 2) can then be designated as a solid structure for the purposes of the inverted 3D CAD file, while space inside the bounds of the external topography of the 3D object as represented, for example, by mold cavities 222a and 222b of FIG. 2, may be designated as empty, hollow space.

At step 405, the CAD device can design a fixture system to constrain one or more fixtures during a 3D printing process. The fixture system may be a structure that can hold the one or more fixtures in place during the printing of a 3D structure (e.g., injection mold 208 of FIG. 2). The fixture(s) can be any suitable objects capable of reinforcing portions of an injection mold. For example, fixture(s) may be included within a 3D printed injection mold with features that may not be able to withstand an adequate number of molding repetitions.

According to some embodiments, the CAD device may also design fixture retention features that are configured to accept fixtures that will be encased in a 3D molded object cast in the injection mold. These fixture retention features may be formed during the 3D printing process or during one or more post-processing steps. In some embodiments, the fixture retention features may be formed at the same time the gates (e.g., gates 224a and 224b of FIG. 2), air vents (e.g., air vents 228 of FIG. 2), and cooling channels are formed.

The CAD device may also design features for facilitating overmolding or comolding of one or more objects using the injection mold. For example, the 3D object may incorporate one or more electronic components, such as a circuit board and a battery, for example. Thus, the CAD device may design features to hold the electronic components in place during the molding process.

At step 407, the CAD device can receive a selection of parameters related to the 3D object. The parameters can include, for example, the dimensions, final material, desired finish, and/or the complexity of the 3D object. As described below, these parameters may be used to determine at least: the number of injection molds needed; the location of one or more gates; which materials should be used to fabricate the injection mold(s); which post-processing steps, if any, are required for the injection mold(s), and which finishes should be applied to the injection mold(s).

The received dimensions may specify both the scalar numbers and the units associated with one or more aspects of the 3D object. For example, the received dimensions may specify a single dimension (e.g., height) along with the height and the units used to measure the height (e.g., 15 cm). All other dimensions of the 3D object may then be inferred using CAD software on the CAD device. In other embodiments, other dimensions may be received, including, for example, the desired dimensions of the injection mold to be produced using process 400.

The received final material parameters may include specifications regarding the materials that may be used to mold the 3D molded object. For purposes of illustration, the final materials may include acrylonitrile butadiene styrene ("ABS") like materials, photopolymers, other types of plastics, rubber, silicone, nylons, epoxies, metals, and/or any other suitable material or materials. In some embodiments, the final material parameters may indicate that a number of different materials may be used to cast a particular 3D molded object or a portion thereof.

Furthermore, the final material parameters may specify which materials may be used for the various shots of a multi-shot molding process. Thus, the final material parameters may specify a first material or materials for a first shot, a second material or materials for a second shot, etc.

The final material parameters may also specify the color or colors of the 3D molded object. Thus, if the 3D molded object is to be multi-colored part, the final material parameters may specify which portions of the 3D molded object are to be molded with the same color. For example, with reference back to FIG. 2, 3D molded object 210 may be a multi-colored part. Each pattern on molded object 210 may represent a different color, finish, and/or final material Desired finish parameters may include any specifications regarding the desired finish for the 3D molded object. For example, the finish parameters may specify that the finish on the 3D object should be glossy, matte, or textured, for example.

Parameters regarding the complexity of the 3D object may include any known specifications that requires special consideration when fabricating the one or more injection molds. For instance, a first complexity parameter may represent a sum of the number of different types of materials, finishes, and/or colors required for the 3D molded object; a second complexity parameter may represent the number, types, and locations of fixtures required for the 3D molded object; a third complexity parameter may represent the number, types, and locations of fixtures required for the injection molds; and a fourth complexity parameter may represent particular geometries that may be difficult to construct, either during the 3D printing process or during the molding process. It should be understood that some of these complexity parameters, may be unknown until the CAD device the visualization file and/or the inverse CAD file. Accordingly, the parameters may be generated by the CAD device rather than the user who created the initial visualization file.

At step 409, the CAD device can alter and/or augment the inverted CAD file based on the parameters. The CAD device can alter and/or augment any number of attributes of the inverted CAD file based on the parameters including, for example, the number of injection molds required to cast the 3D molded object, the location of one or more parting lines, the gate styles and locations, the runner/sprue system if necessary, the cooling system, the part ejection system, the surface finish, the venting system, and various cores and cavities.

For instance, based on the final material parameters received at step 407, the CAD device may determine that the 3D object requires three different injection molds. That determination may involve balancing a number of competing factors. For instance, the CAD device may balance the expense of fabricating a single injection mold capable of receiving two shots of different materials against the expense of fabricating separate injection molds for each shot. The CAD device may also determine that the finishes required for different portions of the 3D molded object preclude using a single injection mold to cast the 3D molded object.

At step 411, the injection mold can be fabricated based on the inverse CAD file. As described above, the injection mold may be fabricated using a combination of different processes. For instance, in some embodiments the entire injection mold may be fabricated using a 3D printer (e.g., 3D printer 106 of FIG. 1). In these embodiments, the 3D printer can receive the altered and/or augmented inverse CAD file and print the entire injection mold, including the mold body, gates, alignment holes, and air vents. The 3D printer may also print around and incorporate any fixtures that are required to reinforce the injection mold.

In other embodiments, only a portion of the injection mold might be fabricated using a 3D printer. For example, a first mold portion (e.g., printed portion 308*a* of FIG. 3) might be fabricated using a 3D printer while the balance of the injection mold might consist of a nonprinted portion (e.g., nonprinted mold portion 308*b* of FIG. 3). The printed portion and nonprinted portions may be coupled together using any suitable process, including using an adhesive, thermal bonding, and/or curing the nonprinted portion about the printed portion.

Additionally or alternatively, the injection mold may be encased within a mold backbone. In various embodiments, the injection mold may be coupled to one or more surfaces of the mold backbone (e.g., using an adhesive, thermal bonding, and/or curing a nonprinted portion about features of the mold backbone), or the mold back bone may be molded over the injection mold (e.g., using a separate injection molding process).

Fabricating an injection mold at step 411 may also involve one or more post-processing steps. For example, the injection mold may be: exposed to a plating process (e.g., electroplating) to strengthen, reinforce, or otherwise beneficially alter the injection mold; buffed, polished, or textured to the finish imparted to the 3D molded object; and/or machined to add one or more features (e.g., gates, air vents, fixture retention features) to the injection mold that were not fabricated during the previous processing steps.

In an additional step, the 3D molded object may be cast using the one or more injection molds fabricated in step 411.

It should be understood that the processes described above are merely illustrative. Any of the steps may be removed, modified, or combined, and any additional steps may be added or steps may be performed in different orders, without departing from the scope of the invention.

The described embodiments of the invention are presented for the purpose of illustration and not of limitation.

What is claimed is:

1. A method for creating at least one three-dimensional (3D) mold, comprising:
   receiving, at a computer aided design (CAD) device, a visualization file representative of a 3D object;
   generating, with the CAD device, a CAD file of the visualization file and representative of at least one mold for injection molding of the 3D object;
   receiving, at the CAD device, parameter information of the 3D object selected by a user;
   designing, with the CAD device, a fixture system based upon the user-selected parameter information of the 3D object;
   altering, with the CAD device, the CAD file based upon the user-selected parameter information; and
   fabricating, with a 3D printer, at least a portion of the at least one injection mold based upon the altered CAD file, wherein the at least one injection mold includes a printed portion coupled to a non-printed portion, wherein the printed portion is fabricated with the 3D printer;
   wherein the user-selected parameter information includes at least one complexity parameter; and
   wherein the at least one complexity parameter includes:
      a first complexity parameter is representative of a sum of the number of at least one of a different types of materials, finishes, and colors required for the 3D object,
      a second complexity parameter is representative of the number, types, and locations of fixtures required for the 3D object, and
      a third complexity parameter is representative of the number, type, and location of at least one fixture required during the fabrication of the at least a portion of the at least one mold.

2. The method of claim 1, wherein the printed portion and the non-printed portion are coupled together using at least one of an adhesive and thermal bounding.

3. The method of claim 1, wherein the printed portion and the non-printed portion are coupled together by curing the nonprinted portion about the printed portion.

4. The method of claim 1, further comprising:
   designing, with the CAD device, at least one fixture for reinforcing at least one feature of at least one mold having a thickness below or an aspect ratio above a predefined threshold.

5. The method of claim 1, further comprising:
   designing at least one of a fixture retention feature, an overmolding feature, and a comolding feature.

6. A system for creating at least one three-dimensional (3D) mold, comprising:
   a system configured with:
      a 3D printer communicatively coupled to the system; and a computer aided design (CAD) device coupled to the system and including a data processor, wherein
the CAD device is configured to:
receive a visualization file representative of a 3D object;
generate a CAD file of the visualization file and representative of at least one mold for injection molding of the 3D object;
receive parameter information of the 3D object selected by a user from a client device;
design a fixture system based upon the user-selected parameter information of the 3D object; and
alter the CAD file based upon the user-selected parameter information, and
the 3D printer is configured to:
receive the altered CAD file; and
fabricate at least a portion of the at least one injection mold based upon the altered CAD file, wherein
the at least one injection mold includes a printed portion coupled to a non-printed portion, wherein
the printed portion is fabricated with the 3D printer;
wherein the user-selected parameter information includes at least one complexity parameter; and
wherein the at least one complexity parameter includes:
a first complexity parameter is representative of a sum of the number of at least one of a different types of materials, finishes, and colors required for the 3D object,
a second complexity parameter is representative of the number, types, and locations of fixtures required for the 3D object, and
a third complexity parameter is representative of the number, type, and location of at least one fixture required during the fabrication of the at least a portion of the at least one mold.

7. The system of claim 6, wherein the printed portion and the non-printed portion are coupled together using at least one of an adhesive and thermal bounding.

8. The system of claim 6, wherein the printed portion and the non-printed portion are coupled together by curing the nonprinted portion about the printed portion.

9. The system of claim 6, wherein
the CAD device is further configured to:
design at least one fixture for reinforcing at least one feature of at least one mold having a thickness below or an aspect ratio above a predefined threshold.

10. A network for creating at least one three-dimensional (3D) mold, comprising:
a system;
a client device communicatively coupled to the system, a computer aided design (CAD) device communicatively coupled to the system; and
a 3D printer communicatively coupled to the system, where the CAD device includes a data processor configured to:
receive a visualization file representative of a 3D object initiated from the client device;
generate a CAD file of the visualization file and representative of at least one mold for injection molding of the 3D object;
receive parameter information of the 3D object selected by a user from the client device;
design a fixture system based upon the user-selected parameter information of the 3D object; and
alter the CAD file based upon the user-selected parameter information, and
the 3D printer is configured to:
fabricate at least a portion of the at least one injection mold based upon the altered CAD file, wherein
the at least one injection mold includes a printed portion coupled to a non-printed portion, wherein the printed portion is fabricated with the 3D printer;
wherein the user-selected parameter information includes at least one complexity parameter; and
wherein the at least one complexity parameter includes:
a first complexity parameter is representative of a sum of the number of at least one of a different types of materials, finishes, and colors required for the 3D object,
a second complexity parameter is representative of the number, types, and locations of fixtures required for the 3D object, and
a third complexity parameter is representative of the number, type, and location of at least one fixture required during the fabrication of the at least a portion of the at least one mold.

11. The network of claim 10, wherein the printed portion and the non-printed portion are coupled together using at least one of an adhesive and thermal bounding.

12. The network of claim 10, wherein the printed portion and the non-printed portion are coupled together by curing the nonprinted portion about the printed portion.

13. The network of claim 10, wherein
the CAD device is further configured to:
design at least one fixture for reinforcing at least one feature of at least one mold having a thickness below or an aspect ratio above a predefined threshold.

14. The network of claim 10, further comprising:
the CAD device is further configured to:
design at least one of a fixture retention feature, an overmolding feature, and a comolding feature.

* * * * *